United States Patent
Bierhuizen et al.

(10) Patent No.: US 6,839,095 B2
(45) Date of Patent: Jan. 4, 2005

(54) SINGLE-PATH COLOR VIDEO PROJECTION SYSTEMS EMPLOYING REFLECTIVE LIQUID CRYSTAL DISPLAY DEVICES

(75) Inventors: Serge Bierhuizen, Wilsonville, OR (US); Lawrence J. Gianola, Wilsonville, OR (US); Benny S. Svardal, Fredrikstad (NO)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/150,527

(22) Filed: May 17, 2002

(65) Prior Publication Data

US 2003/0214617 A1 Nov. 20, 2003

(Under 37 CFR 1.47)

(51) Int. Cl.[7] .................. G02F 1/1335; G03B 21/28
(52) U.S. Cl. ..................... 349/9; 353/99; 359/853; 359/858; 362/302
(58) Field of Search .............. 349/5, 8, 9; 353/99; 359/853, 858; 362/302

(56) References Cited

U.S. PATENT DOCUMENTS

| | | | | |
|---|---|---|---|---|
| 5,414,600 A | | 5/1995 | Strobl et al. .............. 362/32 |
| 5,707,131 A | | 1/1998 | Li .......................... 362/32 |
| 5,967,636 A | | 10/1999 | Stark et al. ................ 353/84 |
| 6,005,722 A | * | 12/1999 | Butterworth et al. ........ 359/712 |
| 6,025,890 A | * | 2/2000 | Chase ...................... 349/9 |
| 6,034,818 A | * | 3/2000 | Sedlmayr .................. 359/497 |
| 6,227,682 B1 | | 5/2001 | Li |
| 6,243,152 B1 | * | 6/2001 | Knox et al. ................ 349/86 |
| 6,327,093 B1 | * | 12/2001 | Nakanishi et al. .......... 359/634 |
| 6,362,922 B2 | * | 3/2002 | Tadic-Galeb et al. ....... 359/649 |
| 6,388,718 B1 | * | 5/2002 | Yoo et al. ................. 349/9 |
| 6,390,626 B2 | * | 5/2002 | Knox ....................... 353/20 |
| 6,476,880 B2 | * | 11/2002 | Tsujikawa et al. ........... 349/9 |
| 6,739,726 B2 | | 5/2004 | Li |

* cited by examiner

Primary Examiner—Tarifur R. Chowdhury
Assistant Examiner—Andrew Schechter
(74) Attorney, Agent, or Firm—Schwabe, Williamson & Wyatt, P.C.

(57) ABSTRACT

A multimedia projector (100) includes a single-path frame-sequential color optical system in which light rays emitted by a light source (14) propagate through a color wheel (102) and an optical integrator (16, 120, 122), and are directed toward a transflective polarizing beam splitter (40) that separates them into P-polarized components (76) and S-polarized components (78). The P-polarized components are transmitted toward a reflective LCD (26) in which pixels in a dark state reflect the light rays without a polarization change and return them through the transflective polarizing beam splitter, whereas pixels in a bright state reflect the light rays with a 90° polarization change as S-polarized light rays (112), which are reflected by the transflective polarizing beam splitter toward a projection lens (27).

5 Claims, 5 Drawing Sheets

SINGLE-PATH COLOR VIDEO PROJECTION SYSTEMS EMPLOYING REFLECTIVE LIQUID CRYSTAL DISPLAY DEVICES

RELATED APPLICATION(S)

Not applicable

FEDERALLY SPONSORED RESEARCH OR DEVELOPMENT

Not applicable

TECHNICAL FIELD

This invention relates to color video projection display systems and more particularly to light source and optical pathway components usable in single-path projection systems employing a reflective liquid crystal on silicon ("LCOS") light valve.

BACKGROUND OF THE INVENTION

Multimedia projection systems have become popular for purposes such as conducting sales demonstrations, business meetings, and classroom training. In typical operation, multimedia projection systems receive analog video signals from a personal computer and convert the video signals to digital information to control one or more digitally driven light valves. Depending on the cost, brightness, and image quality goals of the particular projector, the light valves may be of various sizes and resolutions, be transmissive or reflective, and be employed in single or multiple light path configurations.

Recently, more optimal sets of multimedia projector characteristics have been achieved by employing reflective LCOS light valves. There are various optical architectures for employing reflective LCOS light valves. One employs a polarization beam splitter ("PBS") cube prism and a so-called Philips prism; another employs a PBS cube prism, a dichroic prism, and spectrally selective wave plates; yet another employs multiple PBS cube prisms; still another employs a PBS cube prism and tilted plates; and yet still another employs an off-axis design implemented with linear polarizers, as opposed to PBS cube prisms. For each architecture, a number of variations exist, such as using crossed plates for color separation versus a solid "X-cube" prism color separator, using liquid filled PBS cubes instead of glass PBS cubes, and using additional polarizers or wave plates. However, each of these architectures is generally distinct from the others and from the invention described herein.

All of the above architectures employ linear polarized light-sensitive devices for receiving light from a randomly polarized light source, reflecting the light off the LCOS light valves, and redirecting the reflected light, depending on its polarization direction or state, either out through a projection lens or back toward the light source. The polarization state of the light is determined by an electronic image pattern applied to the LCOS light valve. To achieve a dark state condition, selected LCOS light valve pixels do not change the polarization of the reflected light, so the light returns to the light source and does not project toward the screen. To achieve a bright state condition, selected LCOS light valve pixels rotate the polarization direction by 90°, so the light is directed through the projection lens toward the screen. Projected image quality largely depends on how well the various optical path components establish, maintain, and analyze the light polarization directions. Increased image brightness can be achieved by employing a multi path architecture and minimizing light loss through the various optical path components. Image brightness is also a function of the amount of collected light from the lamp and the color efficiency, which is generally lower for a single path optical system.

In particular, the architecture employing a PBS cube prism and a Philips prism is described in U.S. Pat. No. 5,777,789 for EFFICIENT OPTICAL SYSTEM FOR A HIGH RESOLUTION PROJECTION DISPLAY EMPLOYING REFLECTION LIGHT VALVES, in which a cube PBS allows only linearly polarized light to propagate to a color splitting/combining prism. After reflecting from the light valves, the light is "analyzed" by the PBS cube and redirected according to the polarization direction of the analyzed light. This architecture is disadvantageous because it requires sophisticated optical coatings and non-standard prism angles and has skew ray depolarization caused by the PBS cube prism, stress birefringence caused by long path lengths in glass elements, and considerable weight due to the prisms.

In the architecture employing a PBS cube prism, a dichroic prism, and spectrally selective wave plates, linearly polarized light is first incident on a spectrally selective half-wave plate that changes the polarization direction by 90° for one color band only. A PBS cube separates the rotated color band from the un-rotated color bands based on their orthogonal polarization directions. Typically the green ("G") band is selected as the rotated color band because a dichroic cube splitter relatively easily separates the widely spaced wavelengths of the blue ("B") and red ("R") bands. After reflection from the light valves, the PBS cube analyzes the light, directs it according to its polarization direction, and recombines the color bands. Because the PBS cube has a non-ideal spectral response, a spectrally selective half-wave plate is required at the output face of the PBS cube so that all three color bands have the same polarization direction after passing through the wave plate and can, therefore, all pass through a "clean-up" polarizer. This architecture is disadvantageous because of stress birefringence caused by the large path lengths in glass, skew ray depolarization caused by the PBS cube prism, and considerable weight due to the bulky prisms.

In the architecture employing multiple PBS cube prisms, light is separated into R, G, and B light paths using dichroic filter plates. Each of the three color paths contains a PBS cube, and each PBS cube allows only linearly polarized light to pass through to an associated light valve. Light reflected from the light valves is "analyzed" by the respective PBS cube and redirected according to the polarization direction of the analyzed light. For each color path, light propagating toward the projection lens is recombined with light from the other color paths via an X-cube prism. This architecture is disadvantageous because of considerable aggregate weight of the three PBS cube prisms and the X-cube prism, high component cost and complexity, stress birefringence, skew ray depolarization in the PBS cube prisms, and a large footprint created by the separated color paths.

In the architecture employing a PBS cube prism and tilted plates, the PBS cube prism allows only linearly polarized light to propagate toward a set of tilted dichroic filter plates. The first plate reflects one color band and passes the remaining light to the second dichroic filter plate, where it is further split into two more color bands. After reflection from the light valves, the color bands of light retrace their paths and recombine via the color splitting plates. The light is subsequently "analyzed" by the PBS cube, and redirected according to the polarization direction of the analyzed light. This architecture is disadvantageous because the PBS cube prism is bulky, heavy, has stress birefringence, and skew ray depolarization, and the projection lens requires a long back working distance.

The architecture employing an off-axis design and linear polarizers is described in "Projection Displays V," *SPIE Proceedings*, January 1999, Vol. 3634, pp. 80–86. This architecture employs a two-level arrangement in which the incoming light propagates upwardly at an angle and through crossed dichroic color splitting plates. A sheet type linear polarizer positioned in each color path polarizes the light. The polarized light continues to propagate upwardly and reflects off the light valves. The polarization direction of the light is analyzed by another sheet type linear polarizer in each color path. Light reflected by dark state condition pixels undergoes absorption in the polarizer, and light reflected by bright state condition direction pixels propagates through the polarizer to an X-cube prism color combiner. This architecture is disadvantageous because it has an unduly high-profile, two-level form factor and requires an proprietary, asymmetrical, off-axis projection lens.

What is still needed is a compact, light-weight, low-profile multimedia projection system that achieves a bright, high-quality projected image at a relatively low cost.

SUMMARY OF THE INVENTION

An object of this invention is, therefore, to provide optical architectures for providing bright, reflective LCD light valve-based multimedia projectors.

Another object of this invention is to provide multimedia projectors that are lighter weight, more compact, potentially less costly, and of simpler optical design than prior projectors.

A further object of this invention is to provide multimedia projectors having a single-path reflective light valve optical architecture.

Still another object of this invention is to provide a higher efficiency illumination system for use in multimedia projectors.

The following descriptions of preferred embodiments of this invention refer to P-polarized light and S-polarized light. P-polarized light has a polarization pass orientation in the plane of incidence and reflection, and S-polarized light has a is orthogonal to the plane of incidence and reflection.

A first embodiment of a multimedia projector of this invention includes a color wheel-based frame-sequential color ("FSC") optical system in which polychromatic light rays emitted by a light source propagate along an optical axis through the color wheel and an optical integrator. Diverging and randomly polarized FSC light rays exiting the optical integrator are collimated by a first positive lens, reflected by an optional fold mirror, and directed toward a transflective polarizing beam splitter and a reflective LCD. The FSC light rays striking the transflective polarizing beam splitter are separated into P-polarized components and S-polarized components. The transflective polarizing beam splitter transmits the P-polarized components toward the LCD and reflects the S-polarized components toward a wavelength-selective light sensor that detects a predetermined color component transition and transmits to a FSC controller a color wheel synchronization signal for providing data to the LCD that corresponds to the color component being propagated through the color wheel. The P-polarized FSC light rays are received and reflected by the LCD with their polarization direction selectively changed or unchanged, depending on whether the pixels are switched to a dark or a bright state condition. Pixels in the dark state condition reflect the P-polarized FSC light rays without a polarization direction change and simply return through the transflective polarizing beam splitter toward the light source. On the other hand, pixels in the bright state reflect the P-polarized FSC light rays with a 90° polarization direction change as S-polarized reflected FSC light rays, which are reflected by the transflective polarizing beam splitter and directed toward a projection lens.

In a first alternative embodiment, the light-transmission efficiency of the single-path projector is increased by inserting a single polarization conversion prism assembly following the first positive lens. This causes a substantial majority of the FSC light rays to be P-polarized for transmission through the transflective polarizing beam splitter. In a second alternative embodiment, the polarization conversion prism is replaced by a polarization conversation assembly ("PCA") based on either triangular or trapezoidal fundamental unit geometry, which is essentially an array of small polarization conversion prisms.

A second embodiment of the invention increases the light-transmission efficiency of the single-path projector by replacing the optical integrator with first and second flyseye lens arrays. A collimating lens is placed between the color wheel and the first flyseye lens, and a PCA and condenser lens are placed following the second flyseye lens to focus the resulting quasi-uniformly polarized light through the transflective polarizing beam splitter onto LCD 26.

A third embodiment of this invention simplifies the single-path projector by replacing the color wheel with a liquid crystal-based color-switching device (color modulator) and placing it between the condenser lens and the transflective polarizing beam splitter. This embodiment is further simplified by replacing the collimating lens with a collimating reflector in the light source and positioning the light source close to the first flyseye lens.

A fourth embodiment of this invention includes correction optics to improve the light collection efficiency from the light source. Light from an arc lamp is reflected by a reflector and focused through the color wheel by an aspherical corrector lens. The light emerging from the color wheel is re-collimated with an aspherical lens for propagation through the first and second flyseye lenses, the PCA, and the condenser lens. The aspherical reflector, the aspherical corrector lens and the aspherical lens coact to efficiently collect light from the arc, focus it through the color wheel with a minimal spot and collimate it through the integrator system. The angular spread of the beam at the entrance of the first integrator plate is minimized to match the acceptance angles of the integrator and the multi-PBS to minimize the system Étendue. The aspect ratio of the lenses of the first integrator plate matches those of the second integrator plate.

A fifth embodiment of this invention includes optics for improving light collection efficiency when the light source is optimized for a small Étendue, which enables using reduced size optical components. Étendue is sometimes referred to as geometric extent or light flux throughput. Étendue is important because in an optical system it cannot be reduced without a reduction in light flux. It is of particular importance in the efficient collection of light flux from a light source, which effectively establishes the Étendue of the entire optical system. Using a small Étendue for the system is important for keeping the optics small (less costly). It is also a goal to maintain a relatively fast F# for the projection lens and other optical components, while still collecting the same amount of light.

In this embodiment, to achieve suitable light collecting efficiency at a small Étendue, the light source employs a double-paraboloid reflector having first and second focal points. Light rays are produced by an arc lamp that has its arc located at the first focal point and a compound parabolic concentrator ("CPC") positioned at the second focal point. The light rays enter the CPC over a wide range of acceptance angles but exit with a relatively small exit angle, which establishes the suitably small Étendue for the light source while propagating light having a high flux density.

This invention is advantageous because it provides single-path reflective LCOS light valve-based multimedia projectors that are lighter weight, more compact, potentially less costly, and of simpler optical design than prior three-path projectors.

This invention is further advantageous because it provides improved illumination systems that employ smaller optical components and increases projected image brightness.

Additional objects and advantages of this invention will be apparent from the following detailed description of preferred embodiments thereof that proceed with reference to the accompanying drawings.

DETAILED DESCRIPTION OF PREFERRED EMBODIMENTS

Commercially suitable single-path, reflective LCOS-based, color multimedia projectors have been made possible by combinations of new light sources, optical system, and LCOS device response times. The design and advantages of these single-path projectors are better appreciated by first considering representative three-path projectors described in copending U.S. patent application Ser. No. 09/535,427, filed Mar. 23, 2000, for COLOR VIDEO PROJECTION SYSTEM EMPLOYING REFLECTIVE LIQUID CRYSTAL DISPLAY DEVICES, which is assigned to the assignee of this application.

Figure 1:
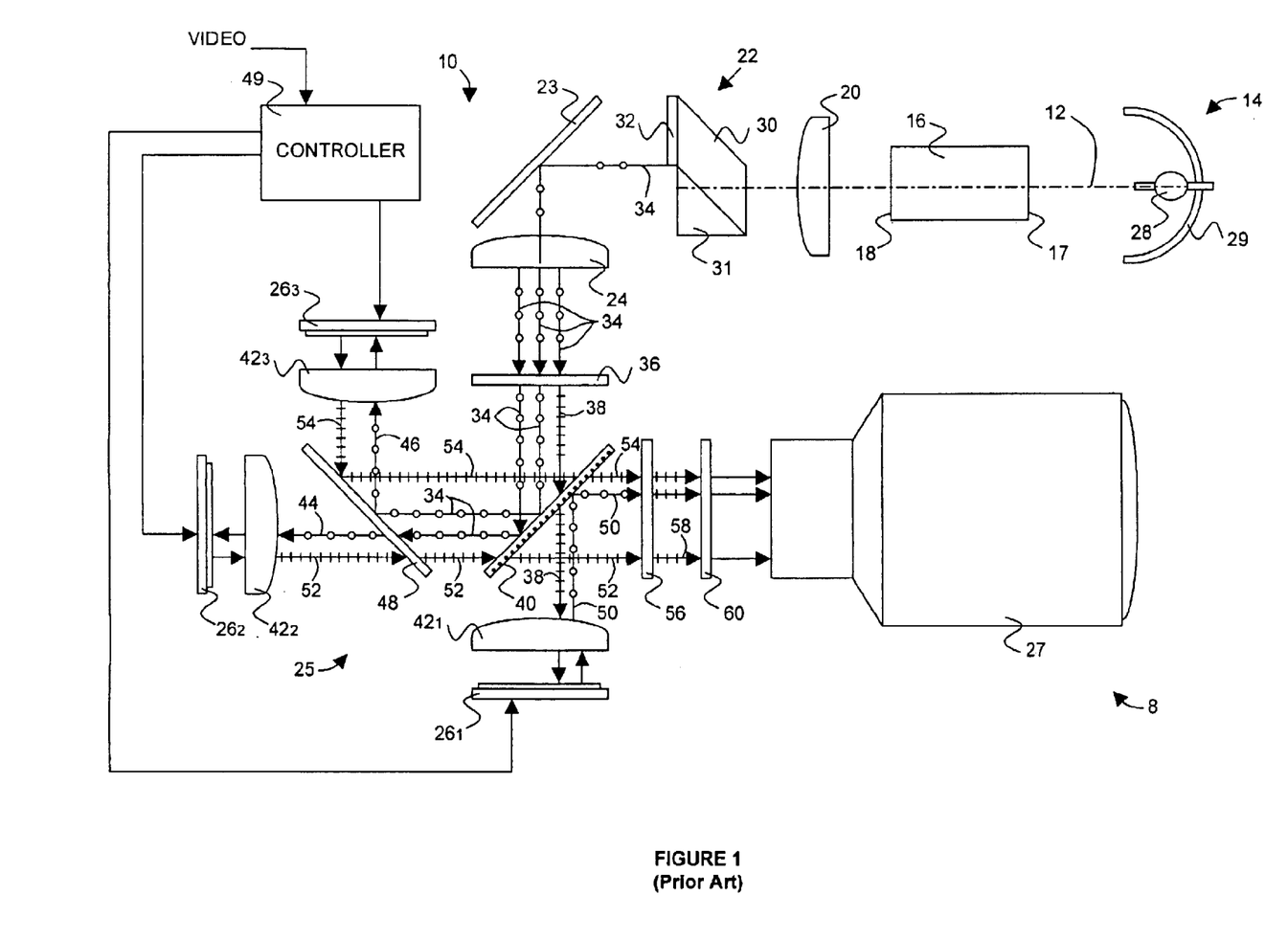
FIG. 1 is a simplified pictorial plan view of a multimedia projector showing a first representative three-path reflective LCOS optical system.

FIG. 1 shows a first representative image projector 8 having a three-path optical system 10 constructed along an optical axis 12 and including a light source 14; a light pipe optical integrator 16 having an inlet end 17 and an outlet end 18; a first positive lens 20; a polarization conversion prism assembly 22; an optional fold mirror 23; a second positive lens 24; a three-path reflective LCD assembly 25 that includes first, second, and third reflective liquid crystal displays ("LCDs") $26_1$, $26_2$, and $26_3$ (collectively "LCDs 26"); and a telecentric-type projection lens 27.

Light source 14 includes an arc lamp 28 mounted at a focus of an elliptical reflector 29. An optional meniscus lens (not shown) may be placed between elliptical reflector 29 and optical integrator 16 to concentrate the light propagating from light source 14 and striking inlet end 17. Optical integrator 16 is an elongated tunnel-type integrator with squared-off flat inlet and outlet ends 17 and 18. Inlet and outlet ends 17 and 18 of optical integrator 16 have cross-sectional aspect ratios that provide a projection display format that is compatible with conventional SVGA and XGA display addressing formats.

First positive lens 20 receives and collimates light propagating from outlet end 18 of optical integrator 16. Polarization conversion prism assembly 22 is of conventional construction, preferably including a 45° rhomboid prism 30, a right-angle triangle prism 31, and a half-wave plate 32. Fold mirror 23 receives S-polarized light rays 34 from polarization conversion prism assembly 22 and reflects them toward second positive lens 24, which receives the reflected S-polarized light rays 34 and transmits them toward three-path reflective LCD assembly 25. (S-polarized light rays are indicated in the drawing figures by small open circles connected together by a line representing a light propagation path.) Because of glass, coating materials, and the Brewster angle, polarizing conversion prism assembly 22 can also be optimized for angles between 37° and 55° and, of course, an optional cleanup polarizer may be positioned before three-path reflective LCD assembly 25.

The S-polarized light rays 34 are received by a spectrally selective input wave plate 36, which transmits with polarization direction change a G range of light rays 34 to form P-polarized light rays 38 and transmits without polarization direction change R and B ranges of light rays 34. (P-polarized light rays are indicated in the drawing figures by short-length transverse lines intersecting a line representing a light propagation path.)

A plate-type transflective polarizing beam splitter 40 transmits the P-polarized G light rays 38 and reflects the S-polarized R and B light rays 34. (Transflective polarizing beam splitters direct and recombine all the wavelength ranges of incident light rays according to their directions of polarization. S-polarized light rays are reflected, and P-polarized light rays are transmitted.) P-polarized G light rays 38 propagate through an optional field lens $42_1$ and impinge telecentrically on first LCD $26_1$, and S-polarized R and B light rays 34 impinge on a dichroic color filter 48, which divides them to form R and B light rays 44 and 46, which propagate through respective optional field lenses $42_2$ and $42_3$ and impinge telecentrically on respective second and third LCDs $26_2$ and $26_3$. (Field lenses $42_1$, $42_2$, and $42_3$ are referred to collectively hereafter as "field lenses 42" and are optional depending on the particular optical arrangement.)

The optical retarders, polarizers, wave plates, transflective polarizing beam splitters, dichroic filters, field lenses, and LCD light valves are available from a variety of manufacturers including ColorLink, Inc. of Boulder, Colo.; Moxtek, Inc. of Orem, Utah; and Sharp Corporation of Nara, Japan. Transflective polarizing beam splitter 40 is typically of a diffractive wire grid type, but acceptable alternatives include transflective polarizing beam splitters formed from multilayer thin films, cholesteric polymer liquid crystals, and laminated polymer sheets. The latter type consist of laminating together multiple thin polymer sheets, each having a different index of refraction, such as "DBEF" sheets available from 3M.

Each of LCDs 26 includes an array of pixels that are individually controllable by a controller 49 that receives video information from analog or digital signal sources, such as a personal computer. Controller 49 interprets the video information and conveys to LCDs 26 pixel image patterns that control each pixel to reflect light in one of two orthogonal polarization directions depending on whether the pixel is switched to a dark or bright state condition. Pixels in the dark state condition reflect incident light rays without change in polarization direction, and pixels in the bright state reflect incident light rays with a 90° rotation in polarization direction. Grey scale images may also be generated with LCDs 26 by employing methods in controller 49 that vary according to the specific type of LCDs. The grey scale imaging methods fall roughly into analog and digital classes. In analog LCD driving schemes, grey scales are typically achieved by driving the LCDs to a level between the dark and bright state conditions to cause partial polarization phase retardation in the LCD. In digital LCD driving schemes, grey scales are typically achieved by employing pulse width modulation between the dark and bright state conditions. However, the operation of this three-path projector might best be understood from the following descriptions in which only the dark and bright pixel state conditions are considered.

With respect to the pixel dark state condition, P-polarized G light rays 38 impinging on dark state pixels of first LCD $26_1$ are reflected without change in polarization direction and return as P-polarized G light rays 38 along their original paths toward light source 14 through transflective polarizing beam splitter 40. S-polarized R and B light rays 44 and 46 impinging on respective second and third LCDs $26_2$ and $26_3$ are reflected without change in polarization direction as S-polarized R and B light rays 44 and 46, are recombined by dichroic color filter 48, and return along their original paths toward light source 14 by reflecting off transflective polarizing beam splitter 40.

With respect to the bright state pixels, P-polarized G light rays 38 impinging on bright state pixels on first LCD $26_1$ are reflected with a 90° change in polarization direction as S-polarized G light rays 50 that propagate toward transflective polarizing beam splitter 40. S-polarized G light rays 50 strike transflective polarizing beam splitter 40, which reflects them toward projection lens 27. S-polarized R and B light rays 44 and 46 impinging on respective second and third LCDs $26_2$ and $26_3$ are reflected with a 90° change in polarization direction as respective P-polarized R and B rays 52 and 54 that strike dichroic color filter 48, which recombines and transmits them through transflective polarizing beam splitter 40 toward projection lens 27.

S-polarized G light rays 50 and P-polarized R and B light rays 52 and 54 are received by a spectrally selective output wave plate 56 that changes the polarization direction of S-polarized G light rays 50 into alignment with the polarization direction of P-polarized R and B light rays 52 and 54 to produce P-polarized G, R, and B light rays 58. A "clean-up" polarizer 60 positioned between spectrally selective output wave plate 56 and projection lens 27 color balances light rays 58 by correcting for non-ideal light transmission and reflection responses of transflective polarization beam splitter 40 affecting at least one of the G, R, or B modulated light output beams. Spectrally selective output wave plate 56 aligns the polarization direction of light rays 58 so that clean-up polarizer 60 will not block light in one of the G, R, and B wavelength ranges. Spectrally selective output wave plate 56 and clean-up polarizer 60 cooperate to improve the color purity and may be omitted if color purity is not an issue.

Figure 2:
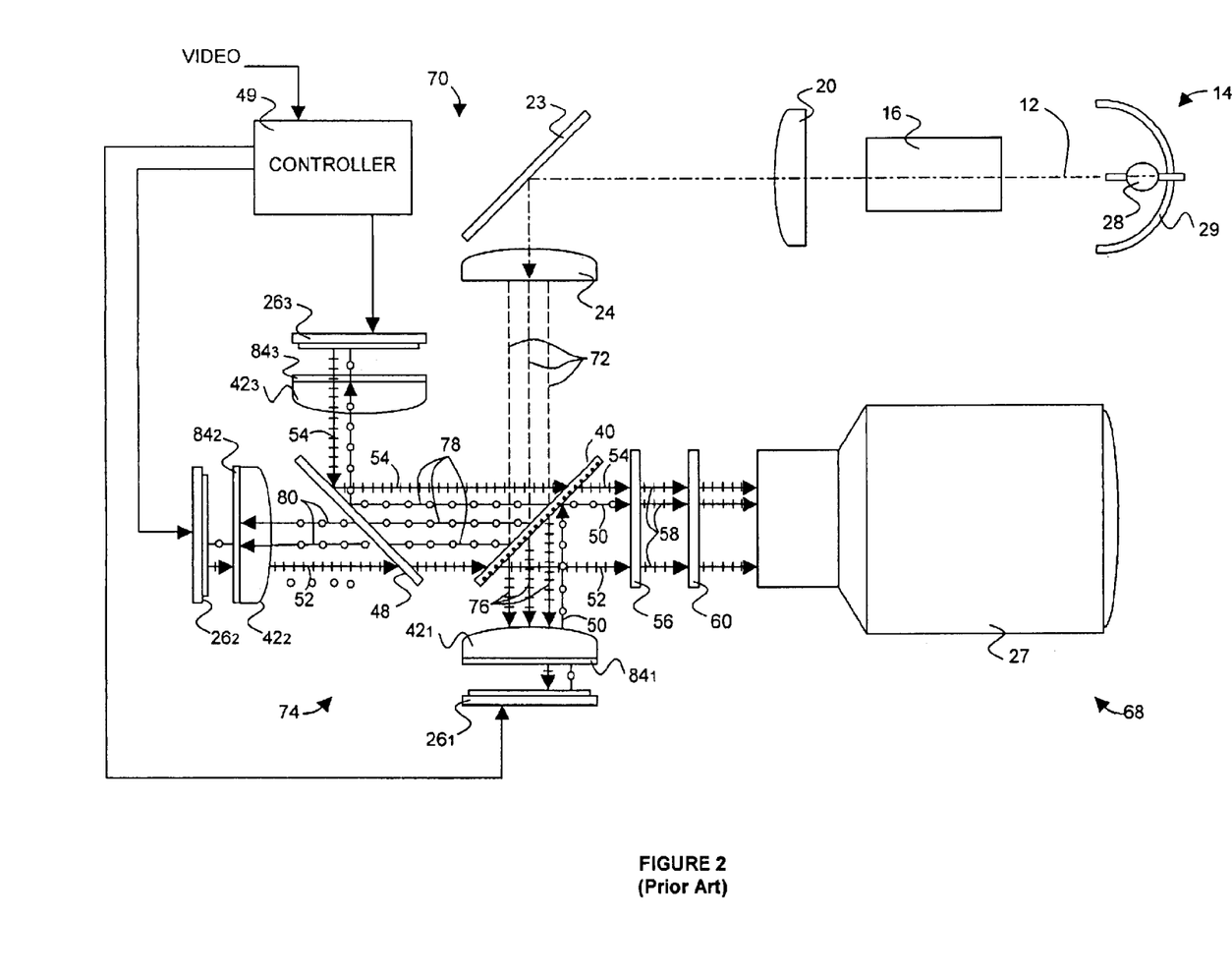
FIG. 2 is a simplified pictorial plan view of a multimedia projector showing a second representative three-path reflective LCOS optical system.

FIG. 2 shows a representative second image projector 68 having a three-path optical system 70 that is constructed similarly to optical system 10 but includes neither polarization conversion prism assembly 22 nor spectrally selective input wave plate 36. Accordingly, randomly polarized G, R, and B light rays 72 propagate toward a three-path reflective LCD assembly 74 and strike transflective polarizing beam splitter 40. The randomly polarized G, R, and B light rays 72 can be separated into P-polarized components 76 and S-polarized components 78. Transflective polarizing beam splitter 40 transmits P-polarized components 76 of G, R, and B light rays 72 toward field lens $26_1$ and reflects S-polarized components 78 of G, R, and B light rays 72 toward dichroic color filter 48. Dichroic color filter 48 transmits S-polarized G and R light rays 80 toward field lens $26_2$ and reflects S-polarized B light rays 82 toward field lens $26_3$.

There is associated with each of field lenses 42 an optional dichroic trim filter coating $84_1$, $84_2$, and $84_3$ (collectively "trim filters 84") placed at a convenient location in the light propagation paths of respective LCDs $26_1$, $26_2$, and $26_3$. Trim filters 84 may be formed on separate substrates, directly on the windows of LCDs 26, or on the surfaces of field lenses 42 as shown. Trim filters 84 reflect selected wavelength ranges of light rays without changing their polarization directions, so the reflected light simply propagates in reverse direction along the same path toward light source 14 without reaching projection lens 27. Light rays having the desired color wavelength range propagate through trim filters 84 for reflection off the pixels of LCDs 26.

In particular, dichroic trim filter coating $84_1$ receives P-polarized G, R, and B light rays 76, reflects the R and B light rays in reverse direction along the same propagation path toward light source 14 and transmits the G light rays toward LCD $26_1$. The G light rays are received and reflected by LCD $26_1$ with their polarization direction selectively changed or unchanged, depending whether the pixels are switched to a dark or bright state condition. The polarization directions of light rays reflected by the pixels the light rays strike causes the G light rays to either propagate toward light source 14 or reflect toward projection lens 27 as described for optical system 10. Likewise, dichroic trim filter coatings $84_2$ and $84_3$ placed in the paths of LCDs $26_2$ and $26_3$ have the same effect on the R and B light rays. In this way each of LCDs $26_1$, $26_2$, and $26_3$ receives and reflects the respective G, R, and B light rays. Dichroic trim filter $84_3$ is not required if dichroic color filter 48 provides suitable B filtering characteristics.

The above-described three-path projectors represent a considerable improvement over conventional prism-based projectors, but are still unduly bulky, optically complex, costly, and difficult to manufacture. This invention overcomes these problems with multiple embodiments of single-path, FSC multimedia projectors.

Figure 3:
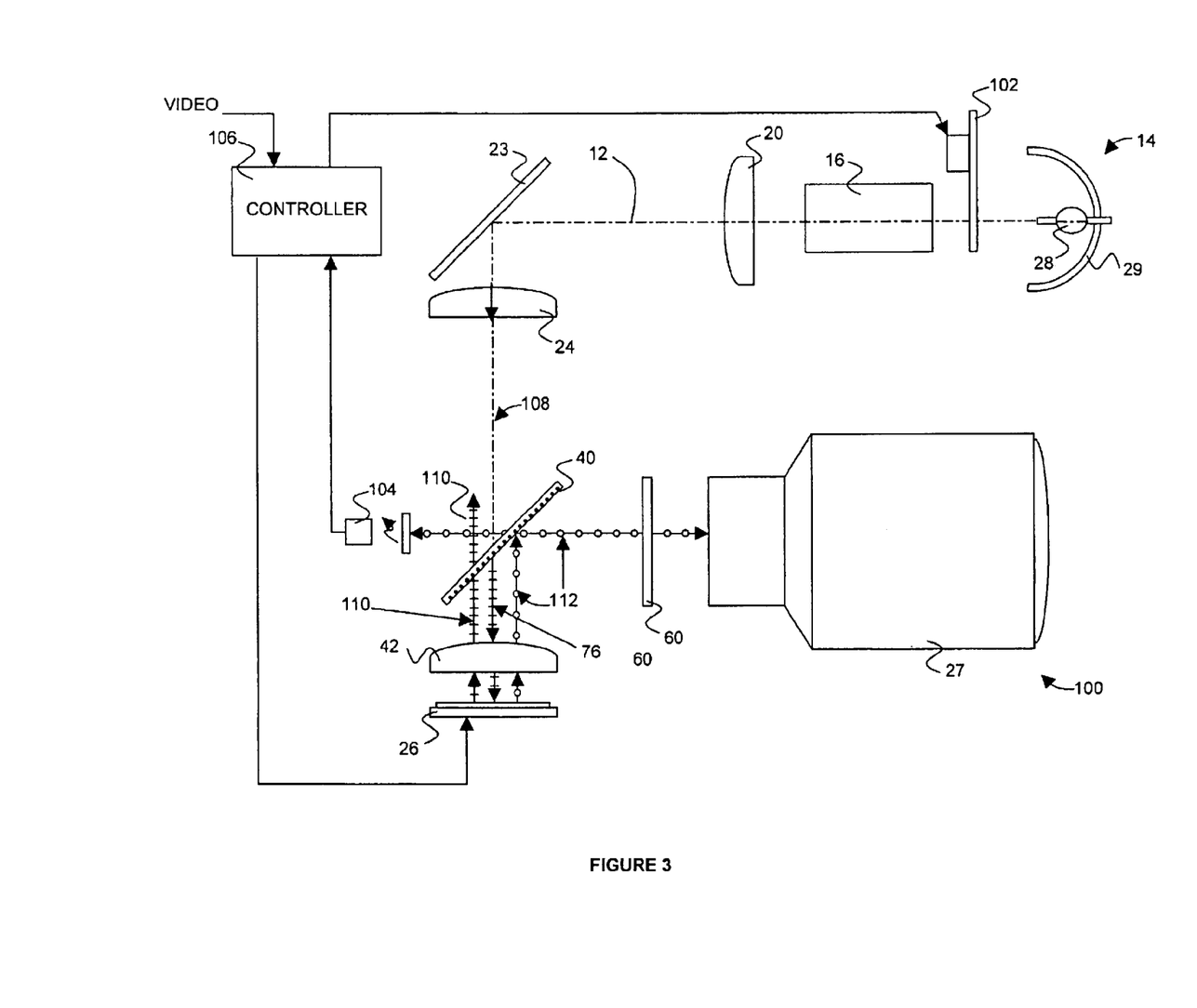
FIG. 3 is a simplified pictorial plan view of a multimedia projector showing a first embodiment of this invention that further supports alternative polarization conversion assembly embodiments of a single-path reflective LCOS optical system of this invention.

FIG. 3 shows a first embodiment of a basic single-path multimedia projector 100 of this invention. Single-path projector 100 is a further simplification of three-path projector 68 of FIG. 2. However, projector 100 further includes a color modulator, such as a liquid crystal-based color switcher, or preferably a color wheel 102, a wavelength-selective light sensor 104, and replaces controller 49 with an FSC controller 106. Projector 100 does not require LCDs $26_2$ and $26_3$, field lenses $42_2$ and $42_3$, trim filters 84, dichroic filter plate 48, nor spectrically selective output wave plate 56. Clean-up polarizer 60 is optional as described below.

Polychromatic light rays emitted by arc lamp 28 are converged by elliptical reflector 29 to propagate along optical axis 12 through color filter segments of color wheel 102 and optical integrator 16. Color wheel 102 preferably includes R, G, B, and light-purplish filter segments. Because the light from arc lamp 28 is typically greenish (deficient in red), the light-purplish (non-white) filter segment produces a more accurate white color point and overall color gamut for multimedia projector 100. Diverging FSC light rays exiting optical integrator 16 are collimated by first positive lens 20, reflected by optional fold mirror 23, and directed toward transflective polarizing beam splitter 40 and LCD 26 as randomly polarized FSC light rays 108. The light rays propagating along optical axis 12 may be further conditioned by optical components such as UV/IR filters, notch filters, or polarizers.

Randomly polarized FSC light rays 108 striking transflective polarizing beam splitter 40 are separated into P-polarized components 76 and S-polarized components 78. Transflective polarizing beam splitter 40 transmits P-polarized components 76 of FSC light rays 108 toward field lens 42 and reflects, and in some cases, scatters S-polarized components 78 of FSC light rays 108 toward wavelength-selective light sensor 104.

FSC light rays 108 preferably include R, G, B, and "light purplish" color components that change as color wheel 102 rotates. Light sensor 104 detects a predetermined color component or component transition and transmits to FSC controller 106 a color wheel synchronization signal. FSC controller 106 employs the synchronization signal to provide LCD 26 with data corresponding to the color component being propagated through color wheel 102. This color wheel synchronization technique is described further in U.S. Pat. No. 5,967,636 for COLOR WHEEL SYNCHRONIZATION APPARATUS AND METHOD, which is assigned to the assignee of this application.

Optional field lens 42 receives P-polarized FSC light rays 76 and propagates them toward LCD 26. P-polarized FSC light rays 76 are received and reflected by LCD 26 with their polarization direction selectively changed or unchanged, depending on whether the pixels are switched to a dark state or bright state condition. Pixels in the dark state reflect P-polarized FSC light rays 76 without a polarization direction change as P-polarized reflected FSC light rays 110, which propagate through transflective polarizing beam splitter 40 and return toward light source 14. On the other hand, pixels in the bright state reflect P-polarized FSC light rays 76 with a 90° polarization direction change as S-polarized reflected FSC light rays 112, which are reflected by transflective polarizing beam splitter 40 and directed toward projection lens 27.

Clean-up polarizer 60 may be optionally employed to correct for non-ideal response of transflective polarizing beam splitter 40, which in practice reflects a small amount of P-polarized light along with the S-polarized light.

Skilled workers will understand that using tilted plate optics, such as transflective polarizing beam splitter 40, presents challenges in the design of efficient optical coatings. For example, poor anti-reflective coatings can produce "ghost" images that may reduce the overall system contrast. Consideration should be given, therefore, to the coating, placement, and orientation of optical components to minimize the possibility of such ghost reflections/images. In this invention, transflective polarizing beam splitter 40 is preferably oriented with its active surface facing the light path between LCD 26 and projection lens 27.

In a first alternative embodiment, the light-transmission efficiency of single-path projector 100 can be increased by inserting a polarization conversion device, such as polarization conversion prism assembly 22 of FIG. 1, in optical axis 12 following first positive lens 20. This causes a substantial majority of FSC light rays 108 to be P-polarized for transmission through transflective polarizing beam splitter 40. The residual S-polarized FSC light rays are reflected toward light sensor 104 by transflective polarizing beam splitter 40.

In a second alternative embodiment of the invention, the polarization conversion device can include a polarization conversation assembly ("PCA") based on either triangular or trapezoidal fundamental unit geometry. There are subtle performance differences between these types of PCAs, and they can be assembled in uni-directional or bi-directional configurations. However, both types of PCAs provide the same basic functionality, given a nearly collimated input beam that contains a mixture of both S- and P-polarized light.

PCAs employ an immersed polarizing beam splitter that separates the two polarization states, such that the P-polarized light passes directly through the coating interface, while S-polarized light is reflected along an alternate path. The S-polarized light is converted into P-polarized light by a half-wave plate on the output face of the alternate path. Thus, substantially all of the light propagating from a PCA has the same polarization state. Skilled workers will recognize that it is possible to construct a PCA that propagates substantially S-polarized light, and that single-path projector 100 can be adapted accordingly.

Figure 4:
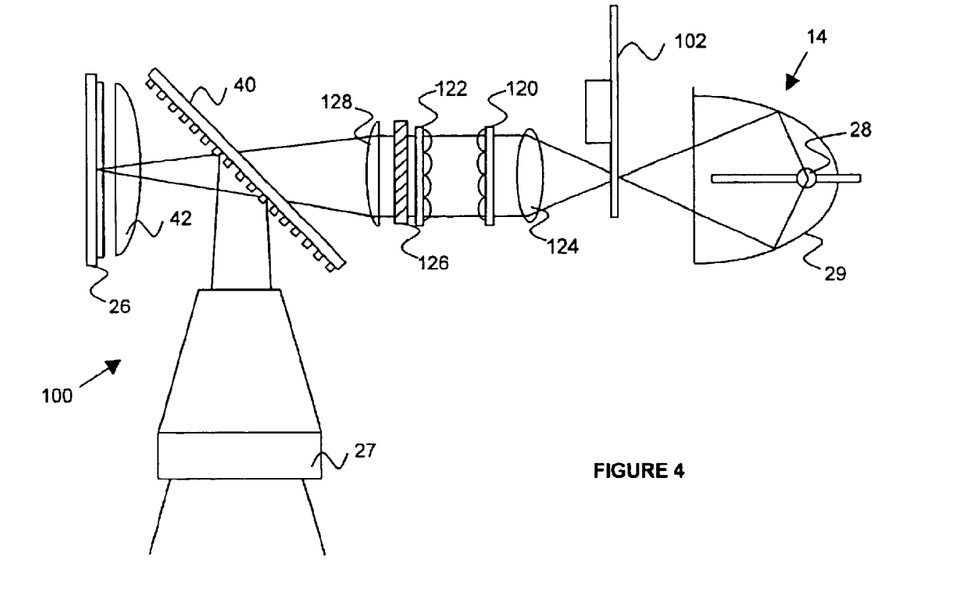
FIG. 4 is a simplified pictorial plan view of a multimedia projector showing a second embodiment of a single-path reflective LCOS optical system of this invention employing improved illumination polarization and integration.

FIG. 4 shows a second embodiment of the invention in which the light-transmission efficiency of single-path projector 100 is increased by replacing optical integrator 16 with first and second flyseye lenses 120 and 122, which function best with a collimated light source. Accordingly, a collimating lens 124 is placed between color wheel 102 and first flyseye lens 120. A PCA 126 and a condenser lens 128 are placed in the light path following first and second flyseye lenses 120 and 122 to focus the uniform polarized light through transflective polarizing beam splitter 40 and field lens 42 onto LCD 26. This embodiment is simplified by eliminating optional fold mirror 23 of FIGS. 1, 2, and 3. Otherwise the image projection functionality of this embodiment is substantially the same as the FIG. 3 embodiments.

Figure 5:
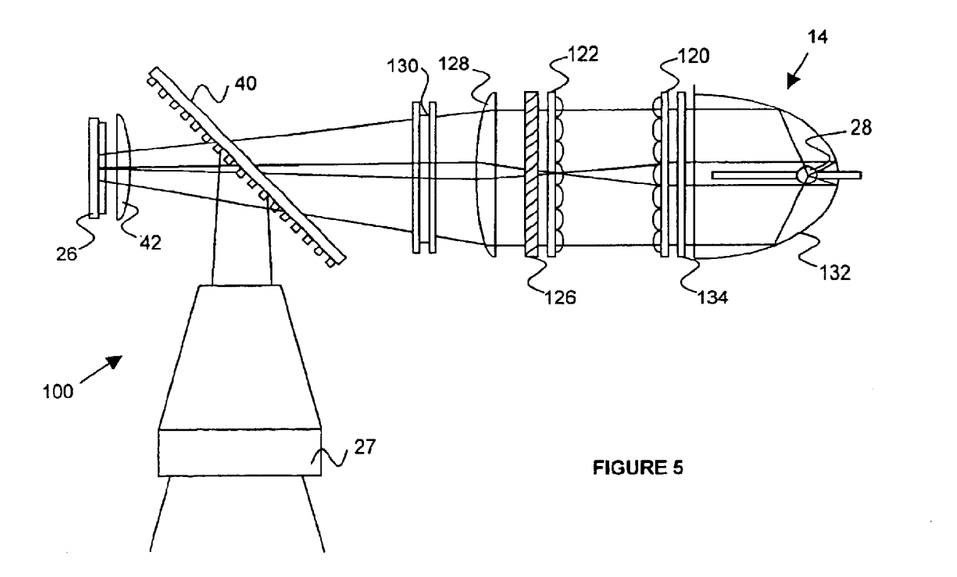
FIG. 5 is a simplified pictorial plan view of a multimedia projector of this invention showing a third embodiment of a single-path reflective LCOS optical system employing improved illumination efficiency and a color switching LCD device.

FIG. 5 shows a third embodiment of this invention in which single-path projector 100 is simplified by replacing color wheel 102 with a liquid crystal-based color-switching device 130 that provides the required sequential light path switching through a predetermined set of colors. As in the FIG. 4 embodiment, this embodiment includes first and second flyseye lens arrays 120 and 122, PCA 126, and condenser lens 128, but does not include optional fold mirror 23. Color-switching device 130 is preferably placed between condenser lens 128 and transflective polarizing beam splitter 40. This embodiment is further simplified by replacing collimating lens 124 with a collimating reflector 132 in light source 14. Space is saved by placing light source 14 close to first flyseye lens 120 and providing an intervening UV/IR filter 134 as a heat shield. Otherwise the image projection functionality of this embodiment is substantially the same as the FIG. 3 embodiments.

Figure 6:
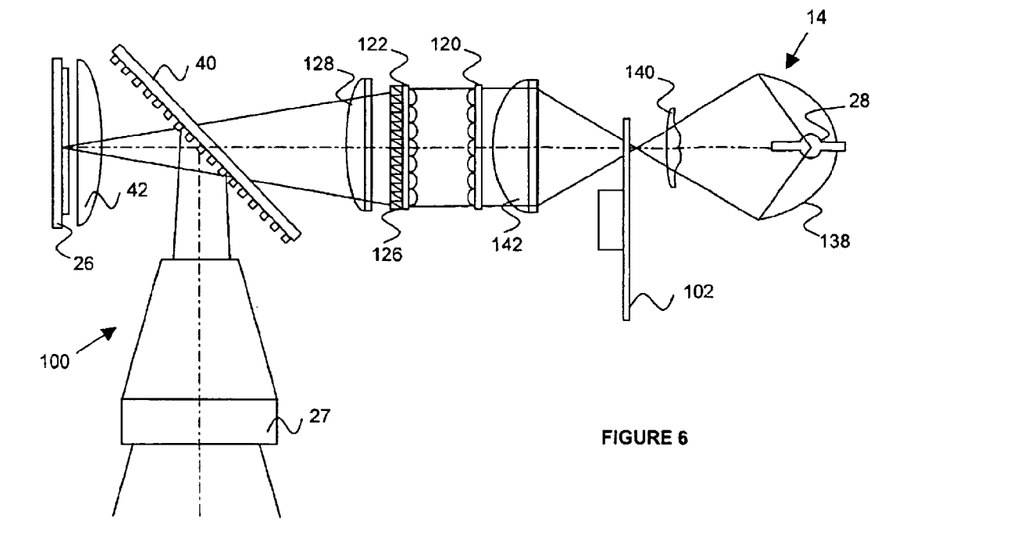
FIG. 6 is a simplified pictorial plan view of a multimedia projector of this invention showing a fourth embodiment of a single-path reflective LCOS optical system employing correction optics for improved illumination efficiency.

FIG. 6 shows a fourth embodiment of this invention in which single-path projector 100 includes correction optics to improve light collection efficiency from light source 14. This embodiment includes first and second flyseye lens arrays 120 and 122, PCA 126, and condenser lens 128 of FIG. 4, but does not include optional fold mirror 23 or collimating lens 124. Light from arc lamp 28 is reflected by an aspherical reflector 138 and focused through color wheel 102 by an optional aspherical corrector lens 140. The light emerging from color wheel 102 is re-collimated with an aspherical lens 142 for propagation through first and second flyseye lenses 120 and 122, PCA 126, and condenser lens 128. Aspherical corrector lens 140 and aspherical collimating lens 142 coact to efficiently collect light reflected by aspherical reflector 138, focus it through color wheel 102, and image it onto first flyseye lens 120 with minimum overfill. Preferably, the light is imaged onto first flyseye lens 120 with an aspect ratio that matches the aspect ratio of LCD 26. Because overfill is reduced or eliminated, optical components downstream of aspherical collimating lens 142 may be smaller and, therefore, lighter and less costly. Otherwise the image projection functionality of this embodiment is substantially the same as the FIG. 3 embodiments.

The illumination system of FIG. 6 is advantageous because it provides increased light collection efficiency; allows using smaller, more closely spaced optical components; improves light homogeneity with fewer lens elements; and allows implementing a more compact projector. Of course, field lens 42 is once again optional.

Figures 7, 8:
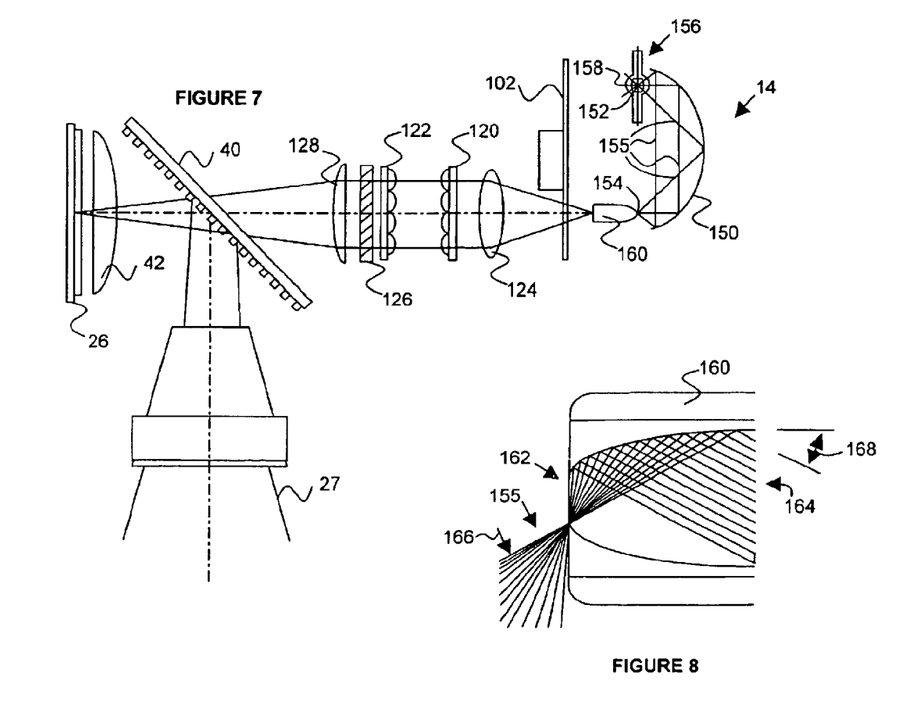
FIG. 7 is a simplified pictorial plan view of a multimedia projector of this invention showing a fifth embodiment of a single-path reflective LCOS optical system employing a modified Cogent reflector and compound parabolic concentrator for improved illumination efficiency at small Étendues.
FIG. 8 is a simplified pictorial cross-sectional view showing ray tracings through a compound parabolic concentrator, such as the one shown in FIG. 7.

FIG. 7 shows a fifth embodiment of this invention in which single-path projector 100 includes optics for improving light collection efficiency when light source 14 is optimized for a small Étendue, which is described below. With the possible exception of light source 14, a small Étendue enables using reduced size versions of all the optical components of FIG. 4.

The geometric entity, Étendue E, is defined as the product of the transverse sectional area of a light beam and the divergence angle of the beam. Étendue is sometimes referred to as geometric extent or light flux throughput.

The geometric entity Étendue E is represented mathematically as:

$$E = \int\int \cos(\Phi) dA d\Omega = A\Omega = A\pi\sin^2(\theta) = \frac{A\pi}{4(F\#)^2},$$

where $\Omega$ defines a cone of light diverging through a cross-sectional area A. Note that E is inversely proportional to the square of the f/#. Accordingly, if one desires a compact (inexpensive) optical system that has high brightness, E and A should be kept small to allow relatively small optics to inexpensively provide a suitably fast f/#.

Étendue is important because in an optical system it cannot be reduced without a reduction in light flux. It is of particular importance in the efficient collection of light flux from a light source, such as light source 14, which effectively establishes the Étendue of the entire optical system.

For small Étendues a Cogent reflector system is more efficient than conventional conic reflector systems. Using a small Étendue for the system is important for keeping the optics small (less costly) while maintaining a fast F# for the projection lens and other optical components.

In this embodiment, to achieve suitable light collecting efficiency (greater than 40%) at an Étendue (less than 7 $mm^2*st$), light source 14 employs a variation of what is referred to as a Cogent reflector system. The light collecting efficiency of the reflector system may be thought of as the fraction of light from the arc lamp that can be collected by the reflector system and passed on to downstream components. In particular, light source 14 employs a freeform, double-ellipsoid, or preferably double-paraboloid reflector 150 having first and second focal points 152 and 154. Light rays 155 are produced by an arc lamp 156 that has its arc located at first focal point 152 of double paraboloid reflector 150. Arc lamp 156 also includes a mirror coating 158 on its surface facing away from double-paraboloid reflector 150 to reflect light rays back through the arc to join with and further intensify light rays 155.

Also referring to FIG. 8, a CPC 160 having input and output ends 162 and 164 is positioned with input end 162 at second focal point 154 of double-paraboloid reflector 150. Light rays 155 enter CPC 160 over a wide range of acceptance angles 166 (up to 90°) but exit with a relatively small and constant exit angle 168 (preferably 30° or less), which establishes the suitably small Étendue for light source 14.

The light exiting CPC 160 and propagating through color wheel 102 is collimated with collimating lens 124 for propagation through first and second flyseye lenses 120 and 122, PCA 126, and condenser lens 128. Moreover, output end 164 of CPC 160 is shaped to match the aspect ratio of LCD 26, which shape is imaged by collimating lens 124 with minimum overfull onto first flyseye lenses 120. As in the other embodiments, the image projection functionality of this embodiment is substantially the same as the FIG. 3 embodiments.

The illumination system of FIG. 7 is advantageous because it provides increased light collection efficiency at small Étendues, which allows a suitably fast optical system while employing smaller and, therefore, less costly optical components, most notably color wheel 102, transflective polarizing beam splitter 40, LCD 26 (a 1.27 centimeter (0.5 inch) LCD may be employed), and projection lens 27. Small optical components are particularly useful for producing compact, lightweight portable projectors.

Advantages of the single-path projectors of this invention include lighter weight, smaller size, fewer and less costly components, and easier implementations than alternative approaches, such as triple-path and large-prism based projection systems. The projectors of this invention are lighter weight partly because prisms are not necessarily required or, because of the small Étendues made possible by this invention, much smaller prisms may be employed to obtain the same light transmission efficiency.

Moreover, there are performance advantages. The projectors of this invention offer higher image contrast because transflective polarizing beam splitters and small prisms have reduced birefringence issues, which are typically caused by residual or thermally induced stresses within large glass prisms. Finally, this invention enables implementing optical projectors having a faster f/#, resulting in higher luminous efficiency and more lumens (brightness) on the screen. This is because of the higher light collection efficiency of the small Étendues made possible by this invention and because transflective polarizing beam splitter 40 does not suffer from f/# limitations. For example, prior glass prisms were limited by optical coating designs to about f/2.5. However, the small Étendues of this invention allow using such prisms at about f/2.0. This is particularly true for the projector embodiments of FIGS. 6 and 7, in which transflective polarizing beam splitter 40 can be replaced by polarization beam splitting prism.

Skilled workers will recognize that various other portions of this invention may be implemented differently from the implementations described above for preferred embodiments. For example, minor optical path variations and additions may be necessary to correct for astigmatism, color aberrations, and other optical distortions. Also, the wavelength ranges, filters, wave plates, and other optical components may employ a wide variety of characteristics, mounting positions, spacings, dimensions, and aspect ratios that are suited to particular displays, such as rear projection, higher resolution, video only, and entertainment applications. UV and/or IR filters may be employed to protect components from damaging heat and radiation. The light source and illumination system embodiments may be used with multi-path systems as well as the single-path systems shown and described. Finally, the preferred embodiments are described with reference to G, R, B, and purplish colors, but the invention is readily adaptable to monochrome, grey-scale, and other color systems.

It will be obvious to those having skill in the art that many other changes may be made to the details of the above-described embodiments of this invention without departing from the underlying principles thereof. The scope of this invention should, therefore, be determined only by the following claims.

We claim:

1. A frame-sequential color ("FSC") video display apparatus, comprising:
   a light source to propagate polychromatic light;
   an aspherical corrector lens to focus the polychromatic light through a color modulation device in order to propagate FSC light, said color modulation device including a selected one of a color wheel or a liquid crystal-based color switching device;
   an aspherical lens to receive the FSC light from the color modulation device and to substantially collimate the FSC light;
   a flyseye lens array to receive the FSC light from the aspherical lens and to substantially homogenize the FSC light;
   a plate-type transflective polarizing beam splitter to receive the FSC light from the flys-eye lens array, to transmit rays of the FSC light polarized in a first polarization direction, and to reflect rays of the FSC light polarized in a second polarization direction; and
   a reflective liquid crystal light valve to receive the FSC light polarized in the first polarization direction, the reflective liquid crystal light valve including pixels selectively switchable between first and second states such that pixels switched to the first state reflect the FSC light in the first polarization direction back through the transflective polarizing beam splitter, and pixels switched to the second state reflect the FSC light in the second polarization direction for reflection off the transflective polarizing beam splitter as image bearing light.

2. The apparatus of claim 1, in which the reflective liquid crystal light valve has an aspect ratio, and in which the FSC light from the flyseye lens array further has a cross-sectional aspect ratio that substantially matches the aspect ratio of the reflective liquid crystal light valve.

3. A frame-sequential color ("FSC") video display apparatus, comprising:
   a double paraboloid reflector having first and second focal points;
   an arc lamp having an arc to generate light rays from the first focal point;
   a compound parabolic concentrator ("CPC") to receive the light rays at the second focal point;
   a color modulation device to receive the light rays from the CPC and to propagate FSC light;
   a polarizing beam splitter to receive the FSC light, to transmit rays of the FSC light polarized in a first polarization direction, and to reflect rays of the FSC light polarized in a second polarization direction; and
   a reflective liquid crystal light valve to receive the FSC light polarized in the first polarization direction, the reflective liquid crystal light valve including pixels selectively switchable between first and second states such that pixels switched to the first state reflect the FSC light in the first polarization direction back through the polarizing beam splitter, and pixels switched to the second state reflect the FSC light in the second polarization direction for reflection off the polarizing beam splitter as image bearing light.

4. The apparatus of claim 3, in which the arc lamp further includes a mirror coating on a surface to reflect light rays emanating from the first focal point in a direction away from the double paraboloid reflector back through the first focal point to join with and further intensify the light rays emanating from the first focal point in a direction towards the reflector.

5. The apparatus of claim 3, in which the light rays enter the CPC over a wide range of acceptance angles and exit the CPC at a substantially smaller exit angle, thereby establishing an Étendue less than about 7 $mm^2$*st.

* * * * *